United States Patent [19]

Arvidsson

[11] Patent Number: 5,775,557
[45] Date of Patent: Jul. 7, 1998

[54] ARRANGEMENT FOR CARRYING A CRAFT ON A VEHICLE ROOF

[75] Inventor: Jan-Ivar Arvidsson, Hillerstorp, Sweden

[73] Assignee: Industri Ab Tlzule, Hillerstorp, Sweden

[21] Appl. No.: 560,875

[22] PCT Filed: Dec. 15, 1992

[86] PCT No.: PCT/SE92/00869

§ 371 Date: Dec. 18, 1991

§ 102(e) Date: Dec. 18, 1991

[87] PCT Pub. No.: WO93/11969

PCT Pub. Date: Jun. 24, 1993

Related U.S. Application Data

[63] Continuation of Ser. No. 244,792, Jun. 10, 1994, Pat. No. 5,516,017.

[51] Int. Cl.$^6$ .................................. B60R 9/00; B60R 9/042
[52] U.S. Cl. ......................... 224/310; 224/309; 224/315; 224/319; 224/321; 224/324
[58] Field of Search ........................... 224/309, 310, 224/315, 318, 319, 321, 322, 323, 324, 325; 414/462; 280/769; 269/59, 60, 66

[56] References Cited

U.S. PATENT DOCUMENTS

| 3,001,679 | 9/1961 | Canning et al. | 224/324 |
| 3,826,390 | 7/1974 | Watson | 224/310 |
| 5,137,195 | 8/1992 | Walter | 224/917 |

Primary Examiner—Henry J. Recla
Assistant Examiner—Timothy L. Maust
Attorney, Agent, or Firm—Royston Rayzor Vickery Novak & Druce

[57] ABSTRACT

An arrangement for carrying a craft such as a kayak or a surfboard. The arrangement includes a carrier bar extending across a vehicle roof which is fastened to opposite edge portions thereof. Holders are provided for engagement with the carrier bars. The holders are provided with arrangements for fixing the holders in selected positions along the carrier bars. Support members for the craft are made from a flexible material and are fastened to the holders pivotally about axes extending lengthwise of the vehicle. At least two arms are provided with each arm being fastened at a first end thereof to each holder and being pivotable about a pivot axis extending lengthwise of the vehicle. The arms have their free ends connected to the support member pivotally above an axis extending lengthwise of the vehicle such that pivoting of the arms adjusts the shape and position of the support members for a particular craft to be carried.

8 Claims, 3 Drawing Sheets

5,775,557

ARRANGEMENT FOR CARRYING A CRAFT ON A VEHICLE ROOF

This application is a Continuation of application Ser. No. 08/224,792, filed on Jun. 10, 1994, now U.S. Pat. No. 5,516,017.

TECHNICAL FIELD

The present invention relates to an arrangement for carrying a craft on a vehicle roof, such as for example a kayak, a surfboard or the like, comprising a bracket device which is securable to a load carrier beam extending transversely across the vehicle roof and which has support members for the craft and clamping means for fixing the craft to the bracket device.

BACKGROUND ART

For transporting, for example surfboards on a vehicle roof, brackets are previously known in the art which comprise an elongate support or padding section which is placed on both of the load carrier beams which are secured transversely across the vehicle roof. The surfboard is laid on this padding and is lashed in place with strap tighteners or other types of straps or webbing. In this design, lateral displacement protection is afforded in that the strap tightener is secured to the load carrier beam and the belt extends about this in a loop up over the surfboard.

Arrangements are also previously known in the art for transporting canoes, kayaks and similar craft, these arrangements having obliquely directed support portions which are secured on the load carrier beam so that a craft resting thereon is prevented from being displaced in a lateral direction. Clamping straps are also employed here, these extending about the load carrier beam for lashing the craft in position.

PROBLEM STRUCTURE

The present invention has for its object to devise an arrangement of the type mentioned by way of introduction, the arrangement being designed in such a manner as to permit simple adaptation to craft of different shapes, not only craft of different widths, but also craft having different arching or angles in the bottom of the hull. The present invention further has for its object to devise an arrangement which facilitates loading and unloading of the craft, which may readily and conveniently be mounted on conventional roof racks and which is simple and economical to manufacture. Finally, the present invention further has for its object to devise an arrangement which affords satisfactory mechanical strength and a high degree of dependability in use.

SOLUTION

The objects forming the basis of the present invention will be attained if the arrangement intimated by way of introduction is characterized in that the bracket device includes two brackets which are each provided with fixing means for fixing the bracket in an optional position along the load carrier beam, the support members including a support portion disposed on each bracket, and of which at least one is pivotally secured in its associated bracket in a shaft extending substantially in the longitudinal direction of the vehicle.

One preferred embodiment of the arrangement according to the present invention is further suitably characterized in that the support portion is connected to an arm pivotally secured in the bracket, the pivot shaft being substantially longitudinal in relation to the vehicle and being horizontal, that the fixing means comprise a fixing portion moveably disposed in relation to the bracket, this portion being switchable between a fixing position engaging with the load carrier beam and fixing the bracket thereon, and an open position in which the bracket is movable along the load carrier beam, the fixing portion being maneuverable between these positions under the action of the arm.

These characterizing features ensure an arrangement which, on the one hand, is extremely flexible and adaptable to a plurality of different shapes and sizes of the transported craft, and, on the other hand, may extremely easily be mounted on and dismounted from a roof rack.

Further advantages will be attained if the arrangement according to the present invention is also given one or more of the characterizing features as set forth in appended claims 3 to 10.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
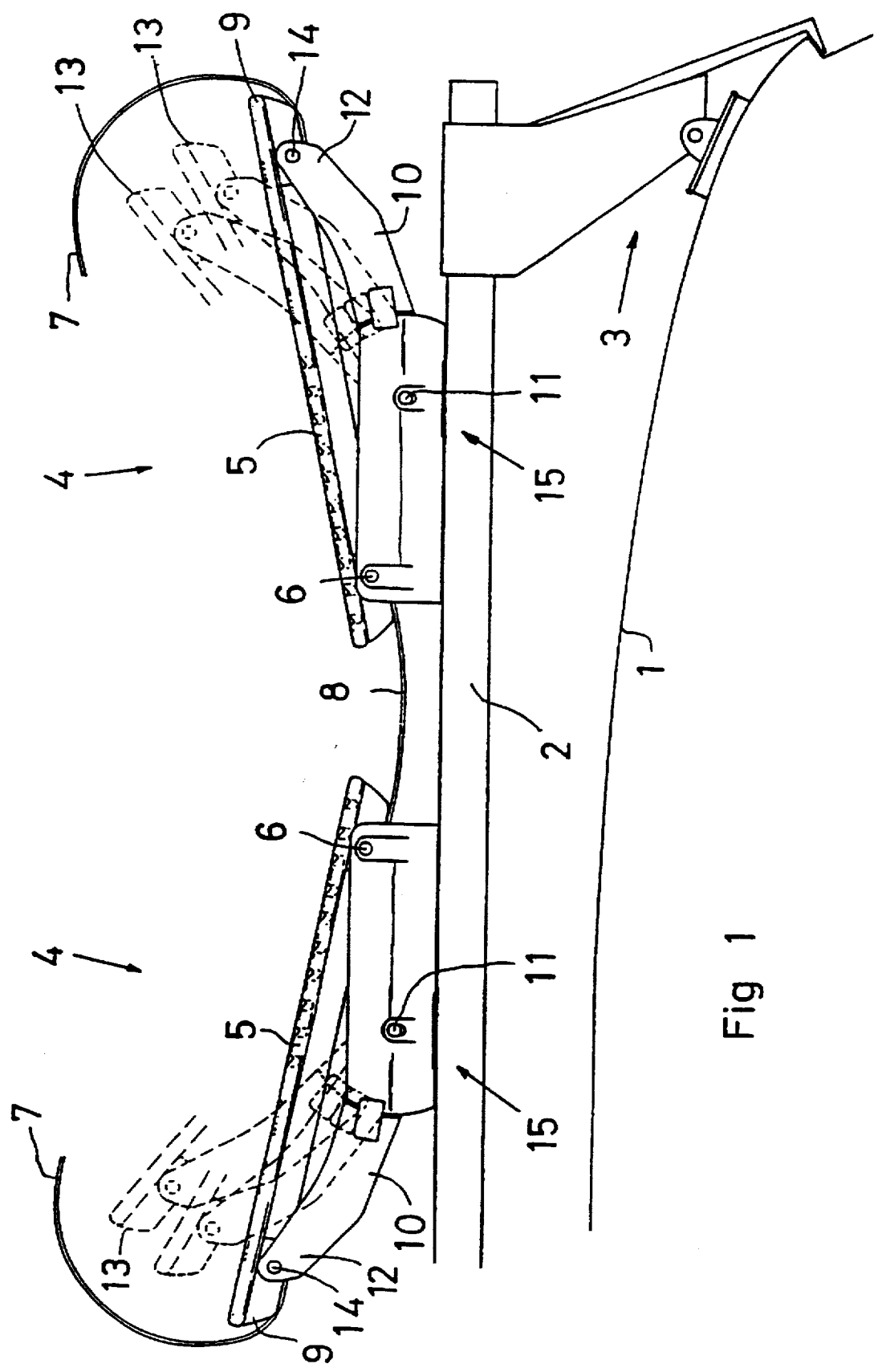
FIG. 1 shows the arrangement according to the present invention placed across a vehicle roof, seen in the longitudinal direction of the vehicle.

In FIG. 1, reference numeral 1 relates to the contour line of a vehicle roof seen from the front or from the rear. Transversely across the vehicle roof, there extends a conventional roof rack with a load carrier beam 2 which, at its opposing end regions, has feet 3 by means of which the load carrier beam is secured in the side edge areas of the vehicle roof. The design of the feet and the vehicle roof and its edge area are not germane to the present invention, but rely on conventional technology in these contexts.

Ideally, the load carrier beam 2 is of the streamlined type and has a longitudinal groove in its upper side. This groove is designed as a so-called T-groove and is undercut for securing different accessories on the load carrier beam.

It will be apparent from FIG. 1 that there is disposed, on the load carrier beam in the proximity of the foot 3, a bracket device according to the invention, the bracket device being intended for the transport of craft such as kayaks, canoes, surfboards or the like.

The portion of the load carrier beam 2 illustrated in FIG. 1 may be the one half of a load carrier beam so that the opposing half may carry an identical bracket device to that shown in FIG. 1, or other type of accessory.

The bracket device comprises two brackets 4 which are displaceable along the load carrier beam 2 and securable in optional positions along the load carrier beam. The brackets 4 are provided with support members in the form of platform support portions 5 on which the craft is intended to rest. By moving the brackets 4 towards or away from one another, the distance between the support portions 5 may be varied within broad limits, whereby adaptation to different widths of craft may readily be achieved.

The support portions 5 are switchable in different angular positions by being pivotal about a substantially horizontal shaft 6 which is longitudinally directed in relation to the vehicle. Hereby, the direction of the support portions 5 can be adapted to different hull shapes of the transported craft.

Suitably, the support portions 5 are produced as platform like elements of a flexible or possibly also elastic material so that thereby the support portions can be bent to more or less manifestly arched shape. This will contribute to the configurational adaptation between the support portions and the hull shape of the transported craft.

It will be apparent from the above disclosures that the distance between the support portions may readily be adjusted and that the angular position of the support portions about the longitudinal and horizontal shafts 6 may easily be varied, and also that the support portions can be bent to more or less arched shape whereby accurate adaptation to the hull shape is possible.

For making the transported craft fast on the bracket device, use is made of a strap 7 which, with a lower part 8, extends under both of the support portions 5 and in their longitudinal direction. The strap 7 passes up onto the upper side of the support portions 5 at their opposing outer ends 9 and is clamped in place on the upper side of the craft. Since the strap is passed in this manner beneath the support portions, the outer ends 9 of the support portions 5 will be subjected to an upwardly directed force on tightening of the strap on the upper side of the craft.

Each bracket 4 has a pivotal arm 10 which, on either side of the bracket device, is directed out from the central region thereof. The arm 10 is pivotally secured in the bracket 4 about a shaft 11 which is longitudinally directed in relation to the vehicle, and which is also substantially horizontal. Suitably, both of the shafts 6 and 11 may be parallel with one another.

The pivotal fixing of the arm 10 in the bracket 4 implies that the outer end 12 of the arm can be placed in a number of alternative positions as shown by broken lines 13 in FIG. 1. Furthermore, the arm 10 is lockable in a number of such positions.

Figure 2:
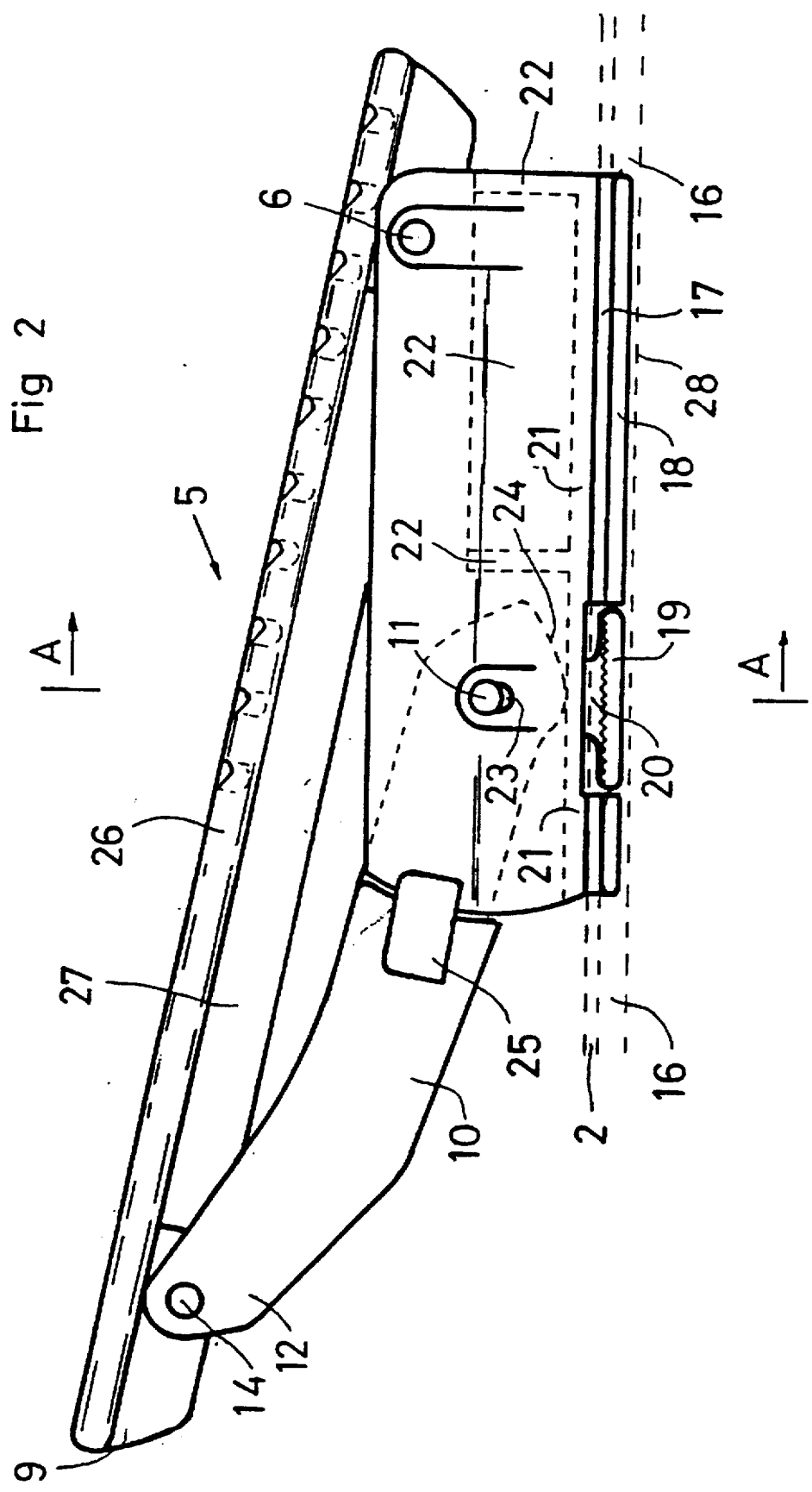
FIG. 2 shows a bracket with an arm and a support member.
Figure 3:
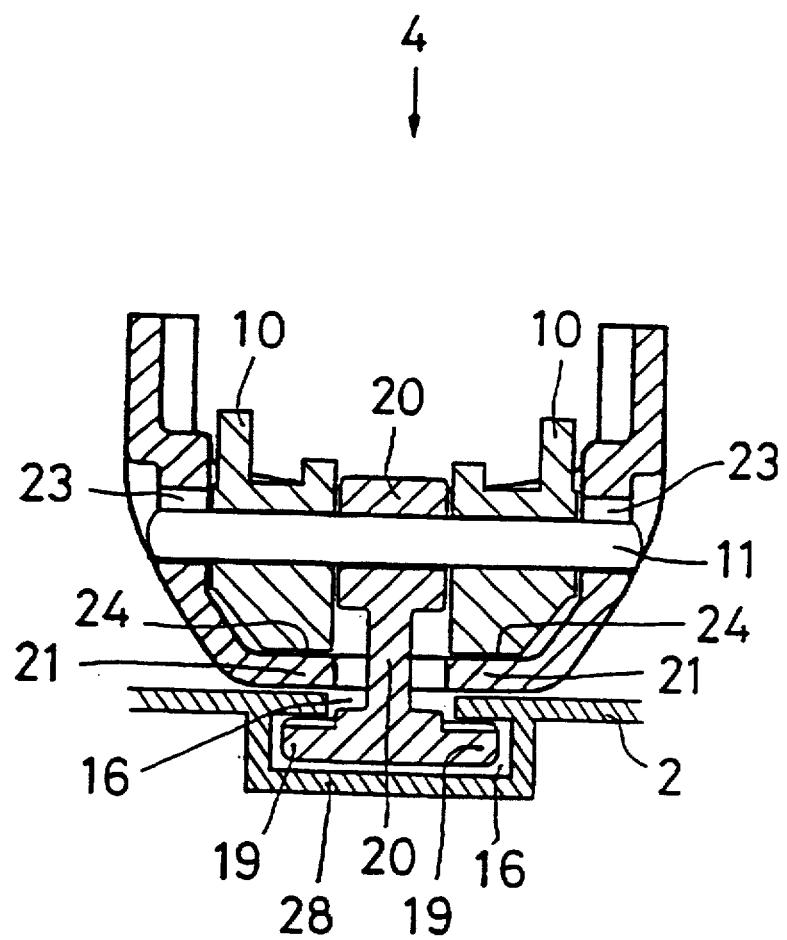
FIG. 3 is a section through the bracket taken along the section marking A—A in FIG. 2.

As is apparent from FIGS. 1 and 2, the support portion 5 is secured, on the one hand, in the bracket 4 at the shaft 6 and, on the other hand, at the free end 12 of the arm 10. The fixing of the support portion 5 in the arm 10 is pivotal about the shaft 14, deformation of the support portion being thereby facilitated so that this portion will be arched or curved.

For positionally fixing on the load carrier beam 2, each bracket 4 has a fixing device which comprises a fixing portion 15 movable relative to the bracket and intended to engage with edge portions about the groove 16 of the load carrier beam. The fixing portion is switchable between a fixing position in which it positionally fixes the bracket on the load carrier beam, and an open position in which the bracket may freely be shifted along the load carrier beam.

A foot 17 rigidly disposed on the bracket also serves for fixedly retaining the bracket 4 on the load carrier beam, the foot extending down into the groove 16 and having, interiorly therein, laterally flared portions 18 which prevent raising of the bracket 4 from the load carrier beam 2 but which permit displacement of the bracket along the load carrier beam. Suitably, the fixing portion 15 is also of the same fundamental design, with laterally flared portions 19 down in the groove 16 and a narrower, upwardly directed stanchion 20 which extends into the bracket 4. With this design of the fixing portion, it will readily be perceived that an upward drawing of the fixing portion via the stanchion 20 will result in a fixed clamping of the bracket 4 on the load carrier beam 2.

In FIG. 2, it is intimated how the bracket 4 has a lower defining wall 21. It will further be apparent that the bracket has inner rigidifying walls 22 which are hardly included as a part of the invention proper. FIG. 2 also shows the shaft 11 which journals the arm 10 in the bracket 4. Those apertures 23 in the wall of the bracket through which end portions of the shaft 11 extend are elongate in the vertical direction so that the shaft 11 has a certain clearance in this direction. It will further be apparent from FIG. 2 that the arm 10 is provided at its lower end with a cam portion 24 which cooperates with the lower wall 21 of the bracket 4. The pivotal range of the arm 10 is such that the arm can be pivoted in a counterclockwise direction from the position illustrated in FIG. 2 to an approximately horizontally projecting position, or possibly a position which lies somewhat beneath this. In a clockwise direction, the arm 10 is pivotal to a position obliquely upwards of the order of magnitude of between 45° and 90° in relation to the longitudinal direction of the bracket 4 or the load carrier beam 2.

The arm 10 is lockable in a number of positions by means of a locking mechanism 25 which is designed in the form of a sliding bolt which, in a slot shaped aperture in the arm 10, is shiftable at right angles to the plane of the paper of FIG. 2. This sliding bolt is suitably spring-loaded towards the locked position when it engages in any optional one of a series of recesses 25a in the end surface of the bracket 4.

The cam surface 24 is shaped in such a manner as to permit, in the downwardly pivoted position of the arm 10 (in FIG. 2 in a counterclockwise direction), the fixing portion 15 to be displaced downwardly by force of gravity or possibly under the action of spring loading so that the laterally flared portions 19 no longer engage with the load carrier beam 2. In this position of the fixing portion 15, the bracket 4 is, thus, free to be shifted along the load carrier beam 2. However, on pivoting of the arm 10 in a clockwise direction in FIG. 2, the cam portion 24 lifts the inner end of the arm, the shaft 11 journalled therein and the stanchion 20 of the fixing portion connected to this shaft. This implies that, on clockwise pivoting of the arm 10, the fixing portion 15 will be lifted so as to engage with the load carrier beam 2 and positionally fix the bracket in relation thereto.

The design of the cam portion 24 is suitably such that the fixing portion 15 is transferred from fixing position already after a relatively slight (10°–20°) pivoting of the arm 10 from its lower position. Once the fixing portion 15 has been transferred to fixing position, the cam portion 24 may be designed as a pure circular arc with the shaft 11 as its centre, so that thereby only the fixing position is retained. Possibly however, the cam portion may also have a slightly increasing radius so that the fixing operation is rendered even more dependable the further up the arm 10 is pivoted.

As an alternative, the cam portion 24 may possibly be designed so that the fixing portion 15 is located in the opened position when the arm 10 is pivoted maximally upwards, and in the fixing position when it is pivoted downwards. In such a design, the weight of the craft will act on the arms 10 in the locking direction whereby the risk is reduced that the brackets be unintentionally moved.

The support portion 5 is, as mentioned above, in the form of a plate 26 which, on its underside, has a rigidifying portion 27. Since the support portion is produced in one piece from a flexible and preferably also somewhat elastic material, the entire support portion can be bent under loading. Suitably, the distance between the anchorages of the support portion 5 for the two shafts 6 and 14 can be approximately as large as the distance between the shafts when the arm 10 is located in its downwardly pivoted position. This implies that, when the arm 10 is pivoted upwards, the distance between the shafts 6 and 14 will be reduced, for which reason the support portion 5 will be forced to assume an arch configuration, at the same time as it is angled upwardly so as to be able to connect to an arched V-bottom.

If the forced arching of the support portion 5 is to be avoided, this can simply be effected by causing one or both of the apertures through which the shafts 6 and 14 extend in the support portion to be oblong in the longitudinal direction of the support portion. On pivoting of the arm 10, in such a design only the support portion will be angled upwardly so as to connect to a straight V-bottom.

It has been mentioned how the strap 7 extends about the outer end 9 of the support portion 5. That upwardly directed force which, on tightening of the strap 7, is applied against the outer end 9 of the support portion 5 (and thereby also against the arm 10), entails that the arm strives to move in the locking direction of the fixing portion 15. This is of particular importance if the locking mechanism 25 were to be omitted or put out of action.

On placing a craft on the bracket device illustrated in FIG. 1, the inner bracket (to the left in the Figure) can suitably be locked fast on the load carrier beam 2 and the support portion 5 be angled up to an estimated starting position. On the other hand, the outer bracket is still free on the load carrier beam 2, with the arm 10 pivoted downwardly as far as possible. This entails that the craft can readily be raised up on the outer portion 9 of the outer support portion 5 in order subsequently to be shifted in over the bracket device until the central portion of the craft lies centred between the brackets 4. In this position, fine adjustment of the position of the outer bracket 4 may take place, whereafter the arm 10 is pivoted upwardly so that the bracket is fixed and so that the outer support portion is given a suitable angle and arching. Thereafter, the strap 7 is applied over the craft and is tightened and secured.

The possibility of loading and unloading with the arm 10 in the downwardly pivoted position on the outer bracket 4 implies a simplified loading and unloading procedure, in particular when the craft in question has a relatively deep V-bottom, in that the then requisite lifting height of the craft is greatly reduced and this can instead be shunted or slewed in over the bracket device.

It will also be apparent from the foregoing that it is unnecessary separately to lock the outer bracket, since the fixing portion 15 is maneuverable under the action of the arm 10.

DESCRIPTION OF ALTERNATIVE EMBODIMENTS

According to the present invention, for example the inner bracket 4 may be permanently fixed on the load carrier beam 2. The inner bracket may possibly also have a fixedly disposed support portion or a support portion which is only angularly adjustable.

Given that an upward drawing is realized against the arms 10 when the strap 7 is tightened, it may, in certain cases, be advantageous wholly to omit the locking mechanism 25 since this could possibly prevent an automatic upward pivoting of the arm 10 and thereby fixed locking of the bracket 4 on the load carrier beam 2 when the strap 7 is tightened.

If the distance between the anchorages of the support portion 5 for the shafts 6 and 14 is made slightly smaller than the distance between these shafts when the arm 10 is pivoted downwards, the support portion 5 will function as a spring which bulges upwards with its central portion and thereby holds down the arm 10 in its downwardly pivoted position. When the arm 10 is then pivoted upwards, the arching of the support portion 5 will turn downwards, for which reason the function of the upwardly pivoted arm will be as described above.

In such situations when the load carrier beam 2 lacks the longitudinal undercut groove 16 on its upper side, the fixing portion 15 can be designed as a stirrup which extends down under and about the load carrier beam 2. The upwardly directed shanks of this stirrup are secured in the shaft 11 in order to be drawn upwardly on pivoting of the arm 10 and thereby fixedly lock the bracket 4. The counterpart to the foot 17 on the underside of the bracket 4 can, in this embodiment, be designed as a fixed stirrup which grasps about the load carrier beam 2.

Naturally, it is also possible according to the present invention to design the cam portion 24 in such a manner that, on pivoting of the arm 10, it presses down the fixing portion 15 so that this engages against the bottom surface 28 in the groove 16. The present invention may be modified further without departing from the spirit and scope of the appended Claims.

I claim:

1. An arrangement for carrying a craft such as a kayak or a surfboard, comprising:
    a carrier bar extending across a vehicle roof;
    at least one holder for engagement with said carrier bar and having fixing means for fixing said holder in a selected position along said carrier bar;
    at least one support member for the craft, said support member being pivotal about a shaft extending lengthwise of the vehicle;
    clamping means for clamping the craft to said support member;
    said support member connected to an arm, said arm being pivotally fastened to said holder at a pivot axis, said pivot axis being horizontal and oriented substantially lengthwise of the vehicle;
    said fixing means having a fixing member movable relative to said holder so that said fixing member is shiftable between a fixing position engaging said carrier bar and an open position in which said holder is movable along said carrier bar, and
    said fixing member being shiftable between said fixing position and said open position by said arm.

2. The arrangement according to claim 1, wherein said arm extends out from said holder with a free end of said arm being connected with said support member.

3. The arrangement according to claim 2, wherein said carrier bar has, on its upper side, a longitudinal undercut groove, and said holder having an anchorage member extending down into said groove with an enlarged portion.

4. The arrangement according to claim 3, wherein said fixing means extends down into said groove and has an enlarged portion, said fixing means having a neck extending into said holder and being pivotally connected to said arm, said arm having a cam portion cooperating with an abutment surface provided in said holder for transferring said fixing means between said fixing position and said open position upon pivoting said arm.

5. The arrangement according to claim 4, wherein said cam portion is designed so as to transfer the fixing means to said fixing position when the free end of said arm is pivoted upwards.

6. The arrangement according to claim 1, wherein said support member is somewhat flexible and that the distance between its anchorages intended for cooperation with said holder and said arm is slightly greater than a distance between corresponding anchorages thereof, whereby the support member urges the arm to pivot toward a lower position.

7. The arrangement according to claim 6, wherein said cam member is designed to transfer said fixing means to the fixing position when pivoting the arm downwards.

8. The arrangement according to claim 7, wherein said fixing means comprises a strap fastened about an outer end of said support member and around the craft, whereby upon tightening said strap said fixing means is transferred to the fixing position.

* * * * *

UNITED STATES PATENT AND TRADEMARK OFFICE
CERTIFICATE OF CORRECTION

PATENT NO. : 5,775,557

DATED : July 7, 1998

INVENTOR(S) : Arvidsson

It is certified that error appears in the above-identified patent and that said Letters Patent is hereby corrected as shown below:

On the title page, Item [73] assignee change " Industri Ab Tlzule" to -- Industri AB Thule --.

Signed and Sealed this

Eighth Day of September, 1998

Attest:

BRUCE LEHMAN

*Attesting Officer*      *Commissioner of Patents and Trademarks*